US008672561B2

(12) United States Patent
Tootoonian et al.

(10) Patent No.: US 8,672,561 B2
(45) Date of Patent: Mar. 18, 2014

(54) OPTICAL FIBER CABLE CONNECTOR WITH INTEGRATED CABLE SPLITTING

(75) Inventors: Mohammad Tootoonian, Vancouver (CA); Bradley George Kelly, Port Moody (CA); Edward Matthew Rooyakkers, Buraby (CA)

(73) Assignee: Avago Technologies General IP (Singapore) Pte. Ltd.

( * ) Notice: Subject to any disclaimer, the term of this patent is extended or adjusted under 35 U.S.C. 154(b) by 228 days.

(21) Appl. No.: 13/061,041

(22) PCT Filed: Aug. 26, 2009

(86) PCT No.: PCT/CA2009/001184
§ 371 (c)(1),
(2), (4) Date: Aug. 25, 2011

(87) PCT Pub. No.: WO2010/022504
PCT Pub. Date: Mar. 4, 2010

(65) Prior Publication Data
US 2011/0299815 A1 Dec. 8, 2011

Related U.S. Application Data

(60) Provisional application No. 61/092,019, filed on Aug. 26, 2008.

(51) Int. Cl.
*G02B 6/36* (2006.01)
*G02B 6/44* (2006.01)

(52) U.S. Cl.
USPC ............... 385/85; 385/76; 385/77; 385/78; 385/88; 385/114

(58) Field of Classification Search
USPC ........................................... 385/85, 86
See application file for complete search history.

(56) References Cited

U.S. PATENT DOCUMENTS

| | | | |
|---|---|---|---|
| 3,981,422 A * | 9/1976 | Moore | 225/2 |
| 4,422,715 A | 12/1983 | Williams et al. | |
| 4,561,179 A | 12/1985 | Brush, Jr. et al. | |
| 4,953,940 A | 9/1990 | Lanzetta, Jr. et al. | |
| 5,024,505 A * | 6/1991 | Fujikawa et al. | 385/97 |
| 5,208,889 A * | 5/1993 | Cedrone et al. | 385/114 |
| 5,259,050 A * | 11/1993 | Yamakawa et al. | 385/59 |
| 5,975,938 A | 11/1999 | Libby | |
| 7,139,456 B2 * | 11/2006 | Sasaki et al. | 385/114 |
| 2002/0197033 A1 * | 12/2002 | Patel | 385/114 |
| 2008/0232741 A1 | 9/2008 | Grzegorzewska et al. | |
| 2011/0299815 A1 * | 12/2011 | Tootoonian et al. | 385/83 |

OTHER PUBLICATIONS

OptoLock™ EDL300T Preliminary Product Specification, Firecomms Photonic Communications Technology, 2007, pp. 1-8.

* cited by examiner

*Primary Examiner* — Rhonda Peace

(57) ABSTRACT

An optical cable connector is disclosed herein. The optical cable connector includes a housing; an aperture on a side of the housing for receiving unsplit duplex optical cable; a sharp edge, disposed within the housing and positioned to split a portion of the optical cable into two optical fibers when the cable is inserted into the aperture, the fibers for carrying optical signals; and electro-optical transceivers, disposed within the housing and aligned with the two optical fibers to receive the optical signals, the transceivers configured to convert the optical signals into electrical signals. Integrating the sharp edge within the connector precludes a user from having to manually split optical cable prior to inserting the cable into the connector, thereby making the connector relatively easy to use and reducing the likelihood the user will be injured.

18 Claims, 7 Drawing Sheets

PRIOR ART

PRIOR ART

PRIOR ART

OPTICAL FIBER CABLE CONNECTOR WITH INTEGRATED CABLE SPLITTING

FIELD OF THE INVENTION

The present invention relates to connectors adapted to receive optical fiber. More specifically, the present invention relates to connectors adapted to receive optical fiber cable with multiple optical fiber cores.

BACKGROUND OF THE INVENTION

Increasingly, consumers are relying on packet switched networks for the delivery of content. An ubiquitous example of such reliance is the delivery of a myriad of different types of content via the Internet. In order to facilitate the delivery of content via the Internet, it is common for consumers to have high-speed, or broadband, Internet connections. These connections often take the form of a cable or digital subscriber line modem/router that acts as a bridge between a wide area network ("WAN"), such as the Internet, and a consumer's own local area network ("LAN"). While these broadband connections provide much greater bandwidth than older connections available over a traditional public switched telephone network, even with such a broadband connection obtaining the high QOS network access required for high bandwidth content can be problematic.

Content in the form of video is one type of high bandwidth content that is very sensitive to the network limitations inherent in most broadband Internet connections used today. This video content can take the form of both video content transmitted over the Internet, and Internet Protocol Television ("IPTV"), which transmits video content over private networks distinct from the Internet. In both cases, a delay in transmitting packets can result in signal degradation in the form of pixelization or, at worst, a blank video screen, both of which being unacceptable to consumers. Such signal degradation can be remedied by increasing the bandwidth available to the consumer.

One problem currently faced in increasing bandwidth is providing a suitable "last mile" network infrastructure. The "last mile" refers to the final leg of delivering connectivity from a communications provider to a consumer, and includes the wiring that provides connectivity within residences such as houses or apartment buildings, for example. Wiring that relies on electrical signals to convey content through the last mile, such as standard category 5, 5e, and 6 cables ("Ethernet cables") used in traditional Ethernet applications, can be susceptible to noise or interference that results in signal degradation. Such noise or interference is generally non-periodic, cross-coupled "spiky" or "transient" interference (hereinafter collectively referred to as "transients") caused by using certain twisted pairs within the Ethernet cables for traditional telephony signals (such as category 3 cable), which signals are inductively coupled to and consequently cause transients in the twisted pairs used for Ethernet signals. Transients are also caused by running the category 5/5e/6 cable in close proximity to alternating current ("AC") power lines within the house or apartment building, which lines are also inductively coupled to and consequently cause transients in the Ethernet cables. In either case, the result of such transients is that the common-mode rejection benefits associated with Ethernet cables that result from their shielding and use of differential signalling are overwhelmed by the transients, and the transmission of Ethernet signals is noticeably impeded.

To overcome the effects of these transients, telecommunication companies are experimenting with networks that rely, in part, on optical signals for communication. Optical signals, which are immune to transient interference, can be transmitted over optical fibers such as plastic optical fiber ("POF"). Two or more optical fiber cores can be joined together in parallel, and sheathed within an outer covering of sheathing material which physically interconnects but optically separates the parallel optical fiber cores, wherein one fiber core can be used as a transmission path and one fiber core can be used as a reception path, thereby allowing for full-duplex communication. A pair of optical fiber cores so joined together is hereinafter referred to as "duplex optical cable"; a pair of plastic optical fiber cores so joined together is hereinafter referred to as "duplex POF cable". FIGS. 3(a) and 3(b) (PRIOR ART) are simplified line drawings of a common type of duplex POF cable, such as Mitsubishi International Corporation's ESKA™ 2.2 mm duplex POF cable. This cable 30 consists of dual, separate inner cores 32 of plastic optical media for transmitting optical signals, the cores 32 bonded to and held within a plastic outer covering of sheathing material 31 which optically separates but physically interconnects the two inner cores 32.

Networks that rely on optical signals often utilize a centralized media converter distribution node and remote end-point media converters to establish a network that is effectively immune to interference caused by transients. The network typically uses duplex POF cable 30, which is usually hidden from view within the walls of a building, to transmit an optical signal from the centralized distribution node to the end-point media converters, which are wall-mounted. At the centralized distribution node and end-point media converters, which are typically located well away from interfering transients, optical signals can be converted to electrical signals, which can subsequently be transmitted using category 5/5e/6 cable. Category 5/5e/6 cable extending from the end-point media converter can then be coupled to a consumer device such as a computer, for example, thereby providing network connectivity to the consumer device.

As such optical networks become more pervasive, a need is emerging for a simple termination mechanism that will allow the POF cable 30 not only to reside within the walls of a building, but to be able to connect directly to, and to terminate within, consumer devices that require a network connection. Direct termination of POF cable 30 within a consumer device is desirable as it avoids the use of thick and cumbersome category 5/5e/6 cable, and as it avoids the conversion of optical signals into electrical signals, thereby simplifying and reducing the cost of the network infrastructure.

FIGS. 1(a), 1(b), 2(a), and 2(b) (all PRIOR ART) illustrate duplex POF cable connectors that are known in the art. FIGS. 1(a) and 1(b) depict a Firecomms EDL300T-220 OptoLock Ethernet Fiber Optic connector 10. This connector 10 contains both high-speed photodiode and LED devices (not shown) to facilitate both reception and transmission of optical signals, respectively. Connected to a main connector body 11 is a large fluted front 12, containing two separate entry apertures 13 for insertion of prepared POF cable 30. By "prepared POF cable", it is meant POF cable 30 that has been partially split lengthwise at one end, such as by using a very sharp utility or X-acto™ knife, such that a gap 33 exists between the two strands of POF that make up a typical piece of POF cable 30. The connector 10 has no integrated cutting mechanism for splitting the POF cable 30, and therefore only prepared POF cable 30 can be used.

After inserting the cable 30, the fluted front 12 is pressed towards the main connector body 11 as indicated in FIG. 1(b) by the arrow. Pressing the fluted front 12 into the main connector body 11 secures the POF cable 30 within the connector 10. Prior to pressing the fluted front 12 into the main connector body 11, the cable 30 is able to freely slide into and out of the main connector body 11. While this connector 10 is effective and useful for industrial and laboratory use, the rather large size of the connector body 11 (16 mm wide×12 mm high×14 mm deep) and large (12 mm deep) fluted front 12 preclude it from being used in many types of consumer devices such as laptops, switches and routers. Additionally, the fluted front 12 requires too much force to be pushed into the connector body 11 to be effectively integrated into a portable consumer device or a device with a high density arrangement of connectors.

Referring now to FIGS. 2(a) and 2(b), there is shown a simplified line drawing of an Avago Technologies SPFEIM100_G Consumer Fast Ethernet connector 20. As with the Firecomms connector 10, this connector 20 contains both high-speed photodiode and LED devices (not shown) to facilitate both reception and transmission of optical signals, respectively. A main connector body 21 contains two separate entry apertures 23 that allow for insertion of prepared POF cable 30. After cable insertion, a front lever 22 is pressed downwards across the main body 21 toward POF cable 30, which secures the POF cable 30 within the connector 20, as indicated in FIG. 2(b) by the arrow. Prior to depressing the front lever 22, the cable 30 is able to freely slide into and out of the main body 21. While this connector 20 is effective and useful for automotive use and for use in a highly vibratory environment, its size (20 mm wide×18 mm high×17 mm deep, with a 5 mm deep lever) and protruding lever mechanism 22 preclude it from being used in many forms of consumer devices such as laptops, switches or routers. Pushing the front lever 22 downwards requires too much force to allow the connector 20 to be effectively integrated into a portable consumer device, and the connector 20 is physically too large to be used in a consumer device that requires a high density arrangement of connectors.

Consequently, there exists a need for a optical fiber cable connector that is small enough to be used on a consumer device that requires a high density arrangement of connectors, and that can be used with unprepared optical fiber cable having multiple cores.

SUMMARY OF THE INVENTION

According to one aspect of the invention, there is provided an optical cable connector for connecting to an unprepared optical fiber cable having multiple cores. The connector comprises: a housing; an aperture extending through the housing for receiving an optical cable having at least two optical fiber cores for carrying optical signals, each optical fiber core being optically separated and physically interconnected by sheathing material; a sharp edge positioned within the housing so as to split the sheathing material of the optical cable thereby physically separating at least two of the optical fiber cores when the cable is inserted through the aperture and into the housing; and electro-optical transceivers configured to convert the optical signals into electrical signals. Each transceiver is positioned inside the housing so as to be in optical communication with a physically separated optical fiber core inside the housing.

The optical cable connector can further comprise a cable guideway inside the housing. The guideway has a front end in communication with aperture and a rear end in communication with the transceivers. The sharp edge is positioned in the guideway facing the aperture. The cable guideway can be a groove on an inside surface of the housing, and the sharp edge can be a blade which separates a portion of the groove into a pair of passages each in communication with one of the transceivers. There can be a pair of grooves each respectively on the top and bottom inside surfaces of the housing. The pair of grooves are aligned to form a bore inside the housing in which case at least part of the bore is sized to frictionally engage the optical cable. The bore can be sized to receive the optical cable such that the sheathing material interconnecting the pair of optical fiber cores is positioned against the sharp edge when the optical cable is inserted inside the housing.

The aperture can extend through a front wall of the housing. The transceivers can be located near a rear wall of the housing, and the housing can have a plurality of slots through which pins of the transceivers extend out of the housing.

The housing can further comprise a plurality of transceiver cavities on at least one inside surface of the housing between the rear wall and the groove; each transceiver cavity receives one of the transceivers.

The housing can further comprise a lever assembly cavity on at least one inside surface of the housing and in communication with the aperture and cable guideway. A lever assembly is movable within the lever assembly cavity between a secured position wherein lever assembly frictionally engages a portion of the optical cable inserted through the aperture and into the bore, and an unsecured position wherein the lever assembly does not frictionally engage the optical cable inserted through the aperture and into the bore. The lever assembly disposed within the housing can have a cable retaining member. The lever assembly cavity can have a surface inclined such that the cable retaining member is elevated when in the secured position relative to when the cable retaining member is in the unsecured position. The lever assembly can further comprise an actuation member protruding out of the housing and movable by a user to move the lever assembly between the secured and unsecured positions.

The housing can comprise a front wall comprising the aperture and an opening through which the actuation member extends; the opening is dimensioned to constrain the actuation member to move within the width of the housing.

A positioning wedge can be provided which protrudes from the inner surface of the housing; in this case, the cable retaining member further comprises a post protruding therefrom. The post and wedge are positioned relative to each other to contact each other and at least one of the post and wedge has sufficient flexibility that the post is movable past the wedge when the cable retaining member moves between the secured and unsecured positions.

BRIEF DESCRIPTION OF THE DRAWINGS

In the accompanying drawings, which illustrate exemplary prior art and exemplary embodiments of the present invention.

DETAILED DESCRIPTION OF EXEMPLARY EMBODIMENTS

Dimensional or directional terms such as "front", "back", "top", "bottom", "lateral" and "transverse" in this Detailed Description are used merely to assist the reader in understanding the described embodiments and are not intended to limit the construction or operation of the embodiments described herein, nor the orientation or connection of the embodiments to the environment or to other structures.

Figure 1A:
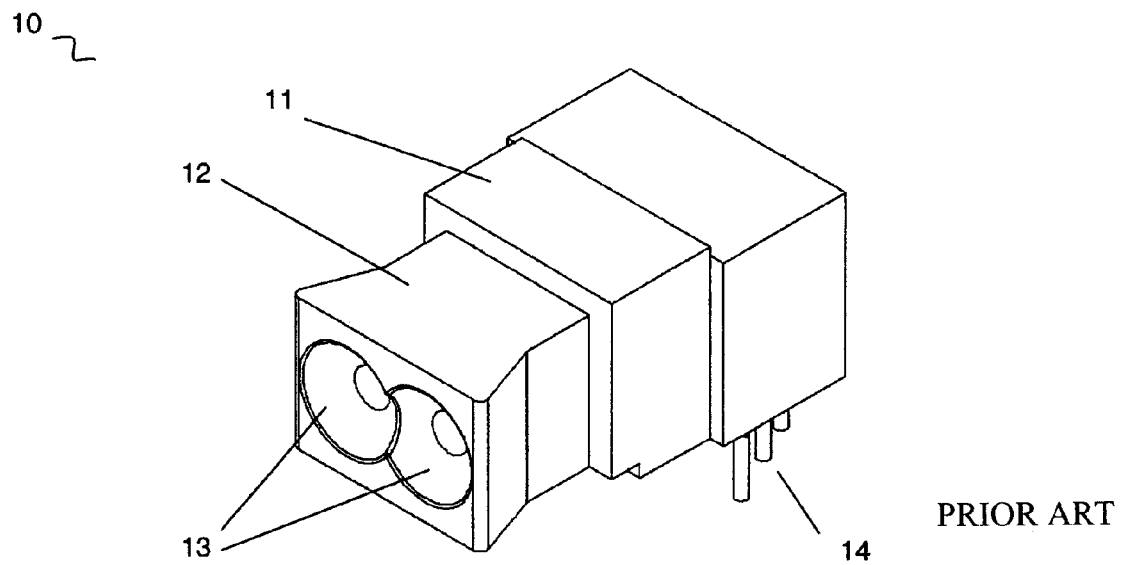
FIGS. 1(a) and 1(b) (PRIOR ART) are perspective views of a first prior art duplex POF cable connector shown in open and closed positions, respectively.
Figure 1B:
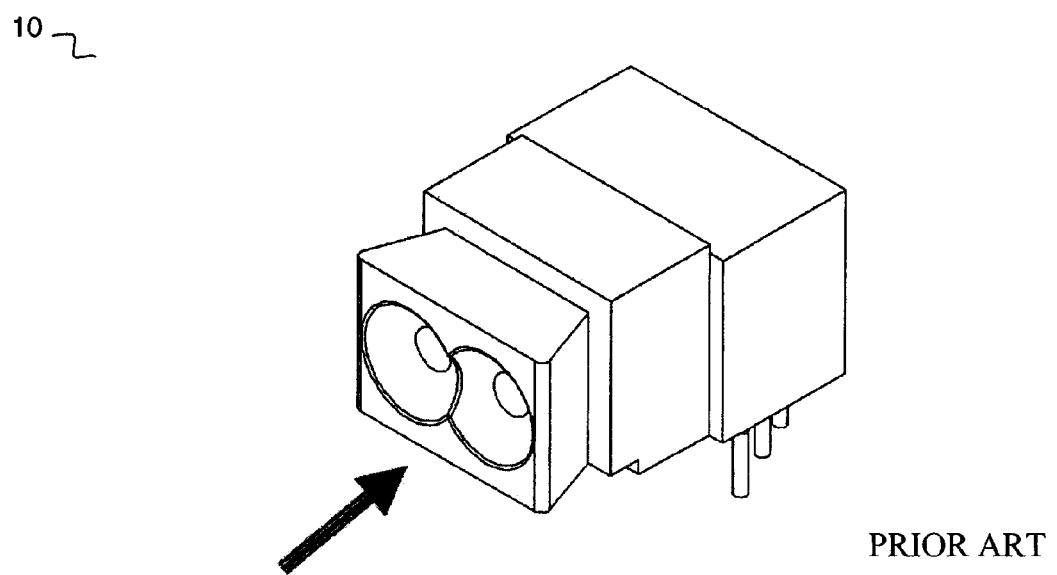
Figure 2A:
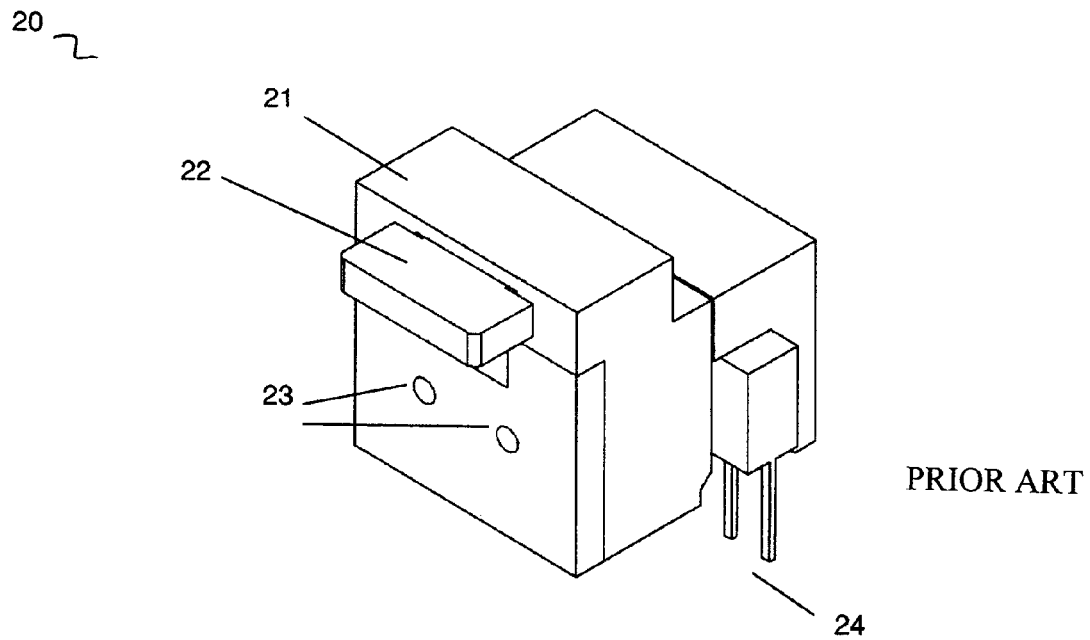
FIGS. 2(a) and 2(b) (PRIOR ART) are perspective views of a second prior art duplex POF cable connector shown in open and closed positions, respectively.
Figure 2B:
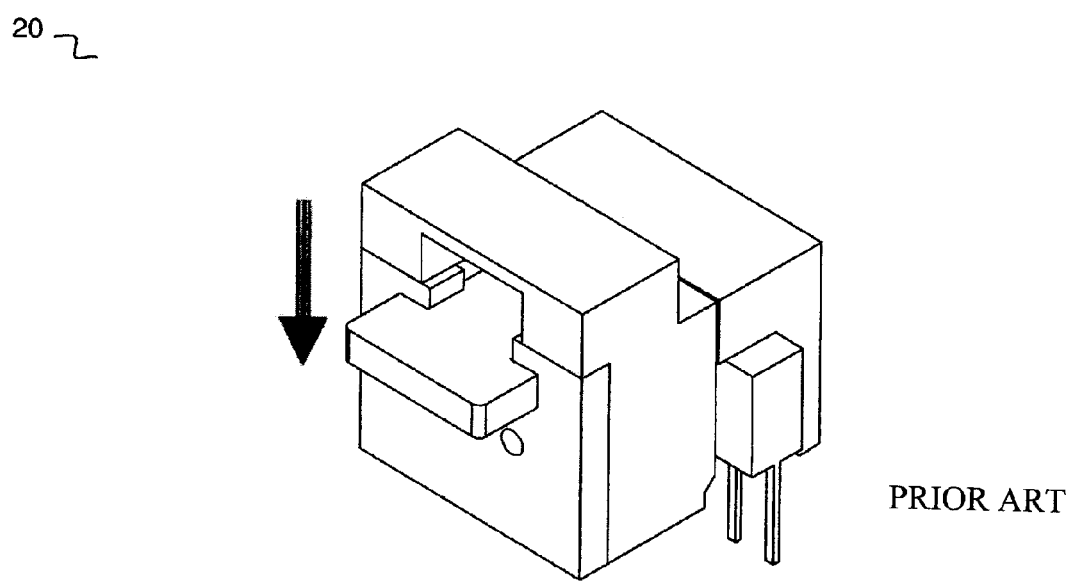
Figure 3A:
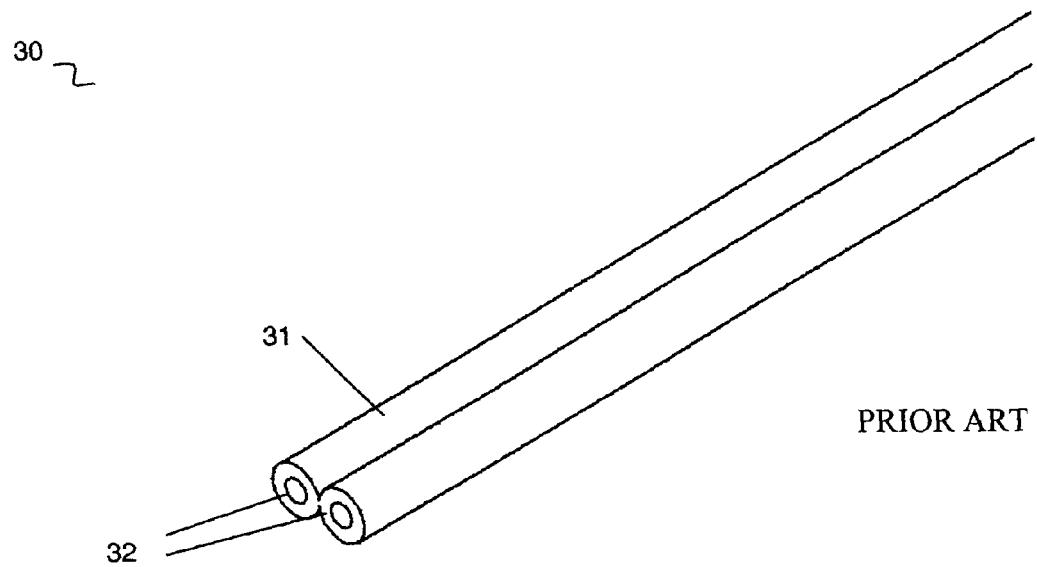
FIGS. 3(a) and 3(b) (PRIOR ART) are perspective views of duplex POF cable in unprepared (unsplit) and prepared (split) conditions, respectively.
Figure 3B:
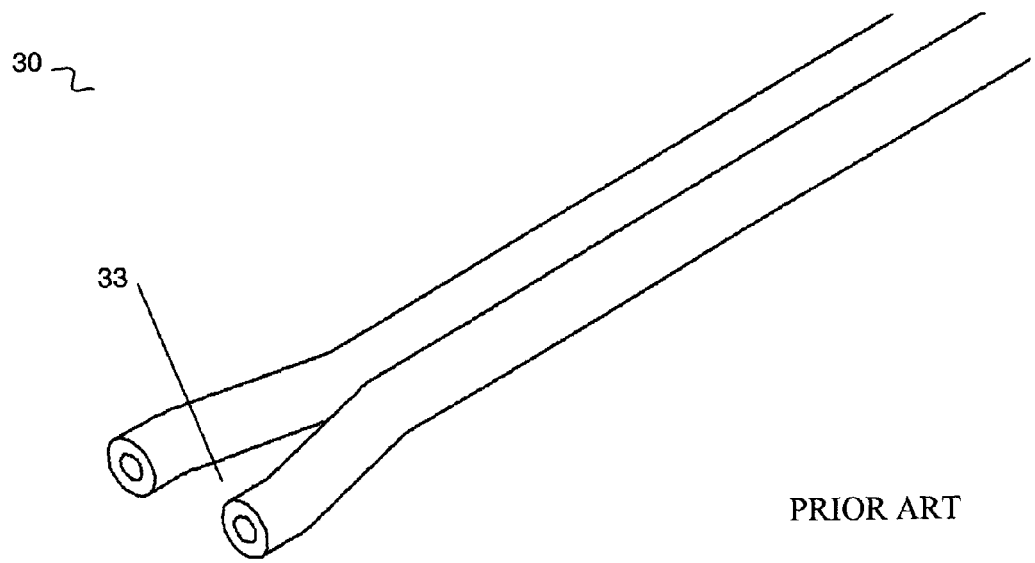
Figure 4A:
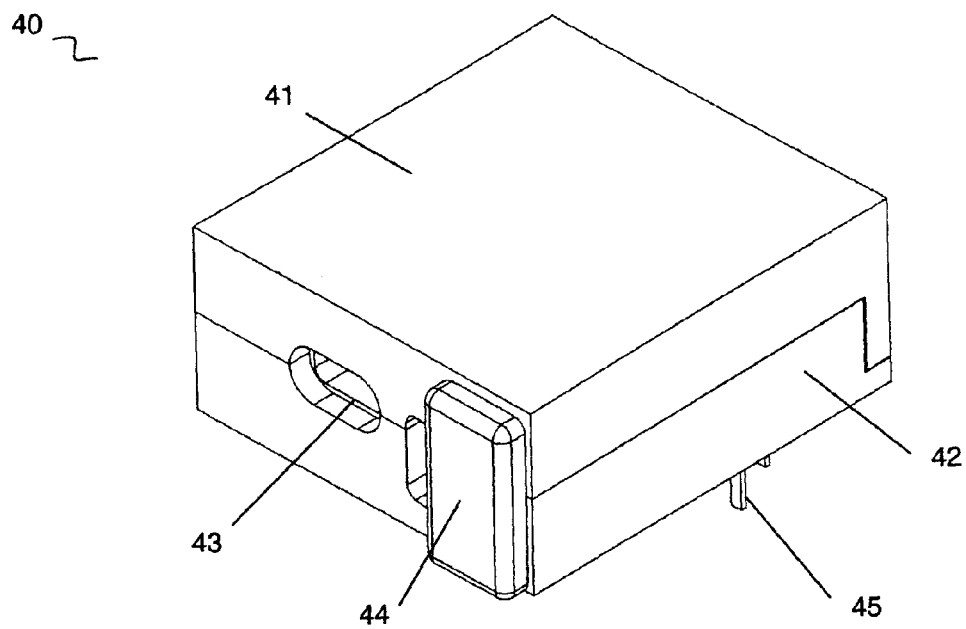
FIGS. 4(a) and 4(b) are perspective views of a optical fiber cable connector, according to a first embodiment of the present invention, shown in open and closed positions, respectively.
Figure 4B:
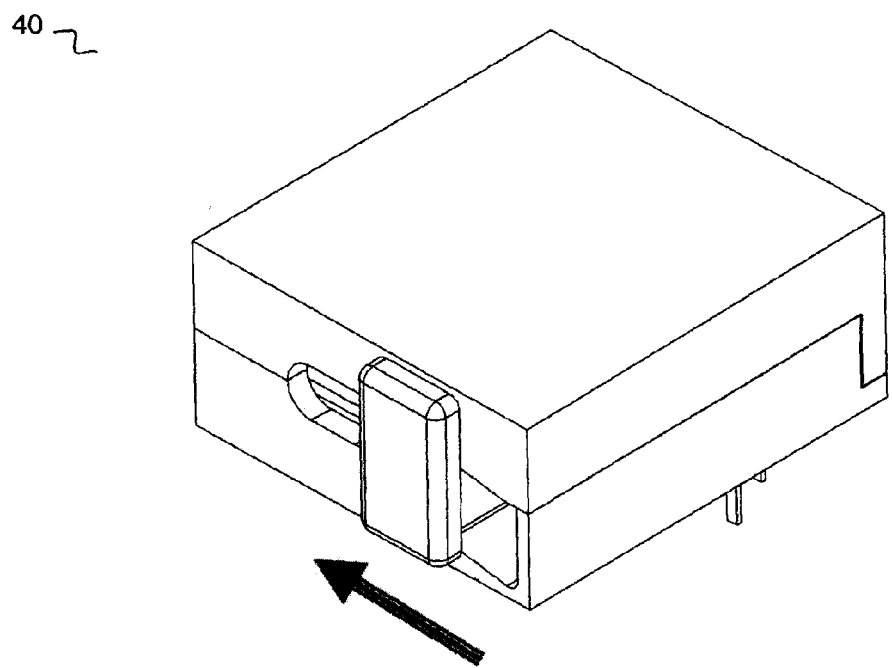
Figure 5:
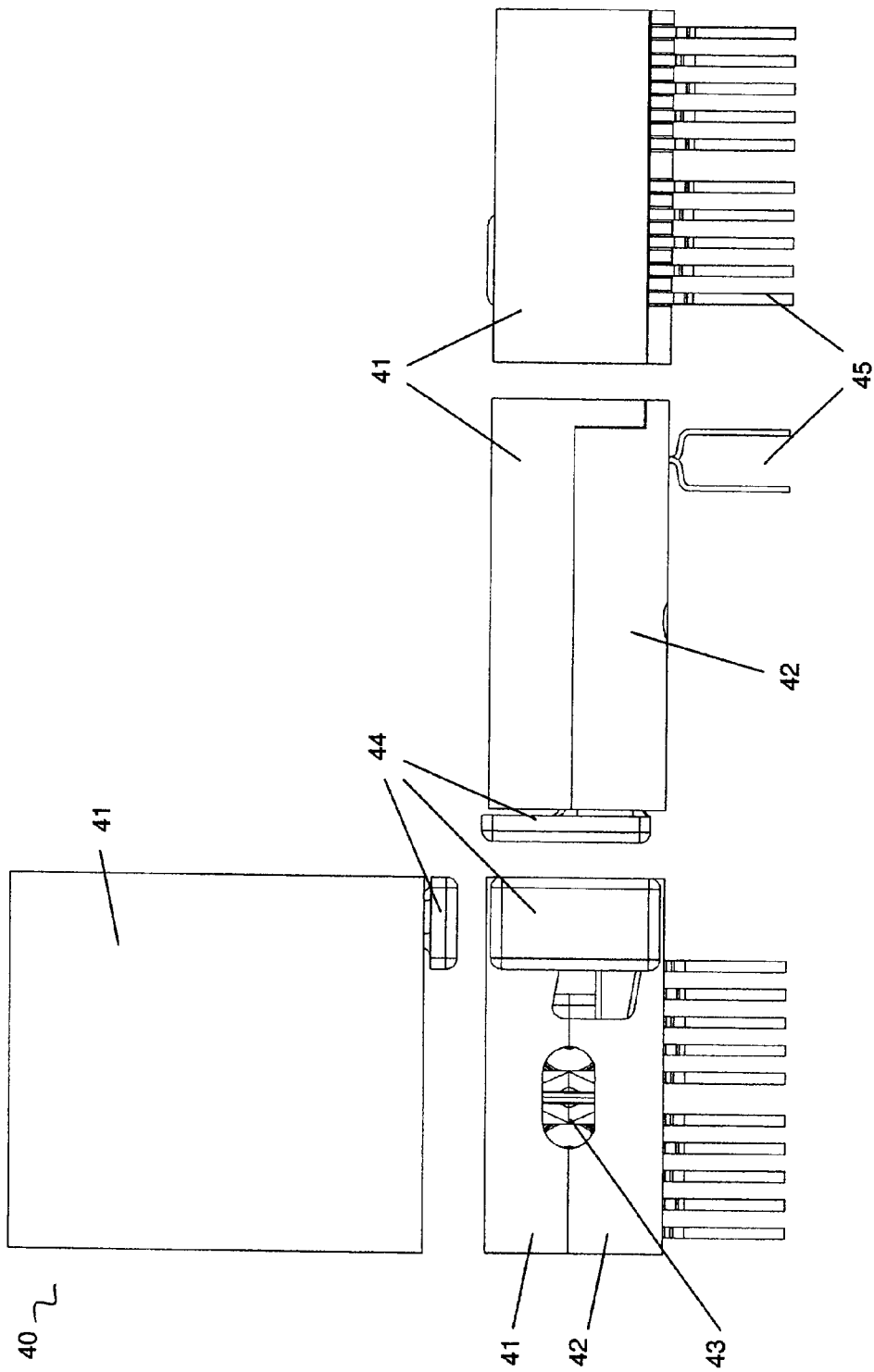
FIG. 5 contains top, front, left side and right side views of the optical fiber cable connector illustrated in FIG. 4(a), shown in an open position.

Referring now to FIGS. 4(a), 4(b), and 5, there is shown a first embodiment of a connector 40 that can receive duplex POF cable 30 and transmit the optical signals conveyed within the cable 30 to electro-optical transceiver devices 48 (illustrated in FIG. 6) in the connector 40. Alternatively, the connector can accept optical fiber cables having cores made of glass, or a composite of glass and plastic. The connector 40 includes top and bottom housing pieces 41 and 42 which, in the illustrated embodiment, are coupled together to form a rectangular housing. On one side ("front side") of the rectangular housing is an aperture 43 for receiving the duplex POF cable 30; the aperture 43 is defined by the edge contours of the front side wall of each top and bottom housing pieces 41, 42 and is sized to allow the cable 30 to snugly pass therethrough. Next to the aperture 43 on the front side wall is an opening for an actuation member 44 that is laterally slidable along the opening between secured and unsecured positions to respectively secure and release the cable 30 from the connector 40; the actuation member opening is also defined by the edge contours of the front side wall of each of the top and bottom housing pieces 41, 42. In the unsecured position (see FIG. 4(a)), POF cable 30 can be inserted into and removed from the connector 40 via the aperture 43; in the secured position (see FIG. 4(b)), POF cable 30 is secured in place within the connector 40 and additional POF cable 30 cannot be inserted into, nor can POF cable 30 be removed from the connector 40. Operation of the actuation member 44 will be described in greater detail with respect to FIG. 6, below).

Figure 6:
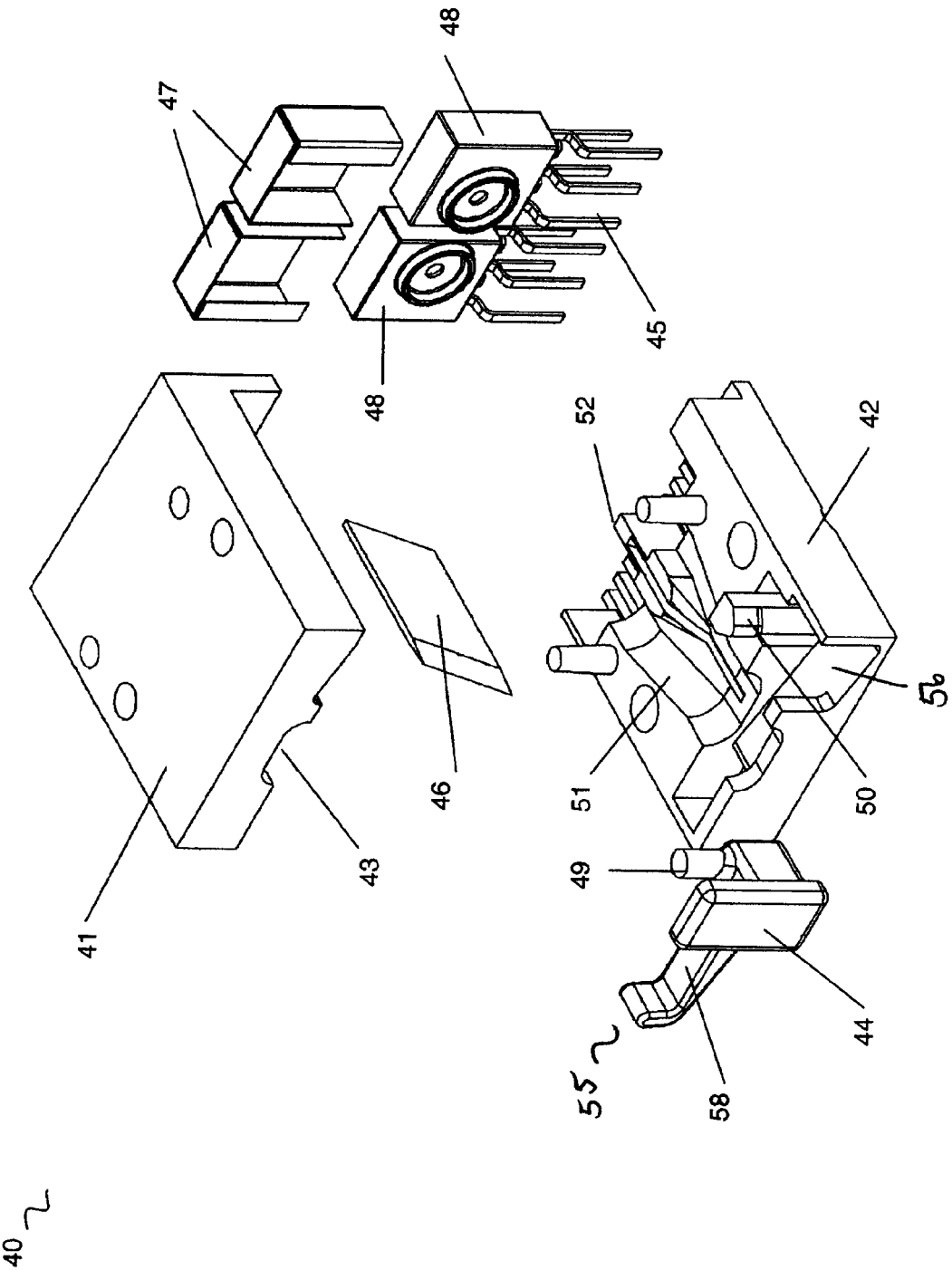
FIG. 6 is an exploded perspective view of the optical fiber cable connector illustrated in FIG. 4(a).
Figure 7:
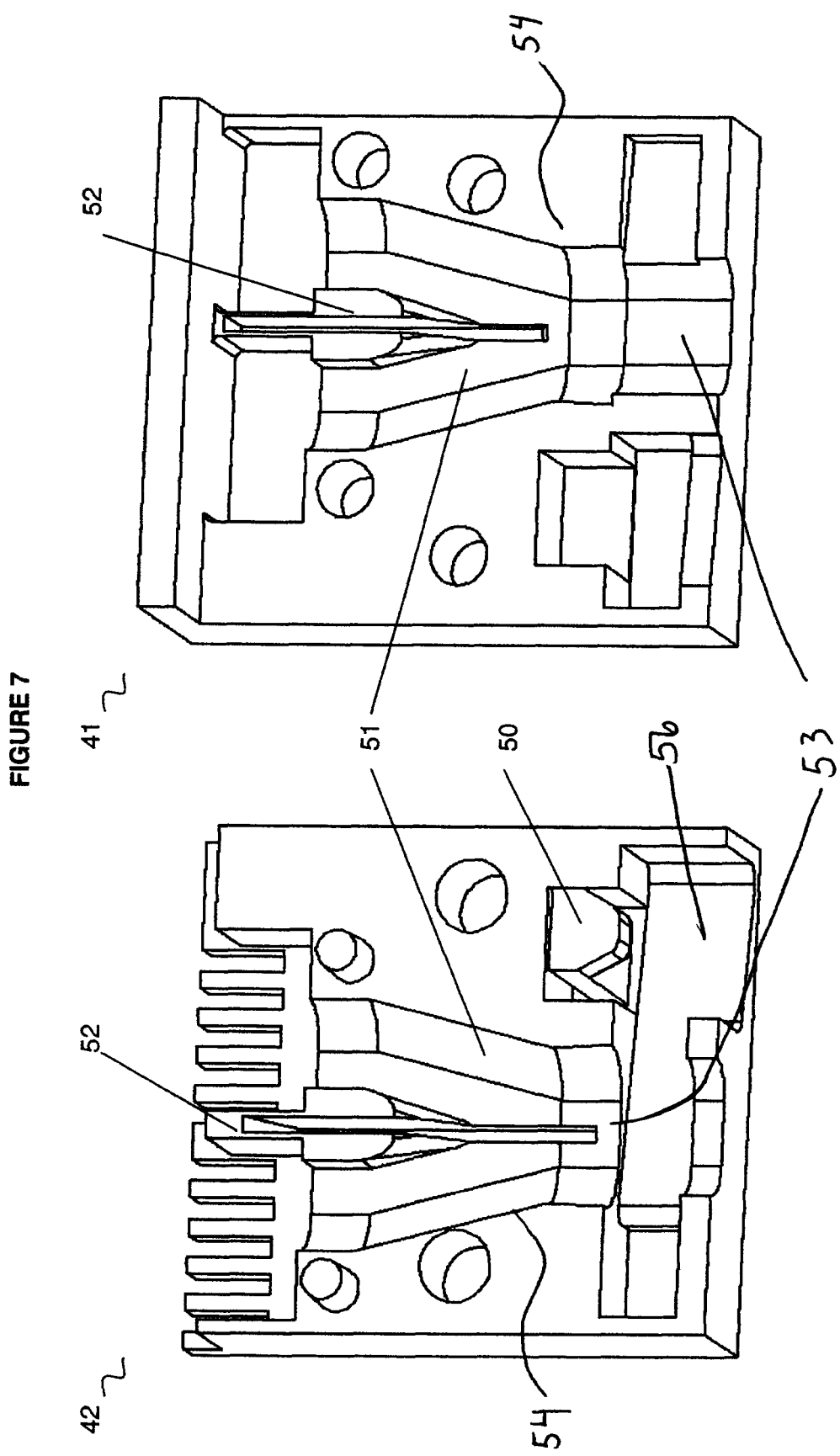
FIG. 7 contains perspective views illustrating the inside of top and bottom portions of a housing of the optical fiber cable connector illustrated in FIG. 4(a).

Referring to FIGS. 6 and 7, formed into the inside surface of each of the top and bottom housing pieces 41, 42 are a pair of laterally spaced cavities sized and shaped to receive the pair of electro-optical transceivers 48. These laterally spaced cavities are located at the rear of the housing pieces 41, 42, just inboard of a rear side wall extending downwards from the top housing piece 42. The cavities in the bottom housing piece 41 have a plurality of laterally spaced slots which extend through the bottom surface of the bottom housing piece 41; these slots are designed to allow metal pins 45 of each transceiver 48 to extend out of the housing 40 (these metal pins 45 are visible in FIGS. 4(a), 4(b) and 5). These pins 45 can be mounted on a printed circuit board (PCB) of a consumer device (not shown), for example, to establish an electrical connection between the connector 40 and the consumer device to which the connector 40 is communicatively coupled. Exemplary electro-optical transceivers 48 are Firecomms EDL300D and EDL300E devices, as well as Giga-bit transceiver devices. The electro-optical transceivers 48 are surrounded by metallic electromagnetic interference shields (EMI) 47 and are held in place near the rear end of the connector 40 to facilitate easy mounting to the PCB. Placing the transceivers 48 near the rear end of the connector 40 is beneficial for at least two reasons. First, when the connector 40 is mounted on the PCB, the pins 45 will be located on an interior portion of the PCB as opposed to on the periphery of the PCB, which can make it easier to electrically couple the pins 45 to the PCB as the interior of the PCB is typically less populated than the periphery. Second, placing the transceivers 48 near the rear end of the connector 40 allows the connector 40 to be more easily redesigned to use different varieties of transceivers 48 (e.g.: transceivers 48 from different companies), as the rear end of the connector 40 can easily be modified without disrupting the components that reside in the remainder of the connector 40.

Also formed into the inside surface of each respective top and bottom housing pieces 41, 42 are respective longitudinally-extending (i.e. front-to-back) guiding grooves 54 for providing a guideway for the POF cable from the aperture 43 to the transceivers 48. A narrower front end 53 of each guiding groove 54 is in communication with the portion of the aperture 43 formed into each top and bottom housing piece 41, 42; an opposite wider rear end of each guiding groove 54 is in communication with the pair of laterally spaced transceivers cavities located at the rear end of the connector 40; each guiding groove 54 tapers outwardly from its front end to its rear end. Inside each guiding groove 54 towards its rear end is a retaining groove 52 for receiving a part of a sharp edge 46 and for separating each guiding groove rear end into two distinct passages 51. The sharp edge 46 is a rectangular blade having at a front end a cutting edge for splitting the sheathing material of the cable 30, as will be discussed further below. The sharp edge 46 is mounted vertically into each retaining groove 52 such that the cutting edge faces the aperture 43. When the top and bottom housing pieces 41, 42 are assembled with the sharp edge 46 and transceivers 48 in place, the guiding grooves 54 form a bore 54 within the connector 40 with the front end 53 of the guiding grooves 54 forming a bore front end 53 in communication with the aperture 43; the bore front end 53 is sized and shaped to be large enough to easily receive the cable 30 but small enough to limit the play of the cable 30 inside the connector 40 thereby precisely lining up the sheathing material bridging the two cores 32 of the cable 30 with the sharp edge 46. The sharp edge 46 is secured by the respective retaining grooves 52 and divides the rear end of the bore 54 into the two distinct passages 51, each in communication with a respective transceiver 48.

Formed in the inside surface of the top and bottom housing pieces 41 are transversely extending (e.g. side-to-side) lever assembly cavities that intersect the aperture 43 and front end of the guiding groove 54; the cavities are in communication with the actuation member opening. The cavity formed into the bottom housing piece 42 has a surface 56 which slopes upwards from the right side of the bottom housing piece 42 towards the intersection with the aperture 43 and guiding groove 54, and receives a lever assembly 55. When the top and bottom housing pieces 41, 42 are assembled with the lever assembly 55 in place inside the cavities, the actuation member 44 extends from the lever assembly 55 through the actuation member opening and outside of the housing 40. The sloping surface 56 provides a pathway for the lever assembly 55 to engage and disengage a portion of the cable 30 extending inside the connector 40.

Upon inserting unprepared duplex POF cable 30 into the aperture 43, the cable 30 extends past the lever assembly cavity and into the bore 54. As the user pushes the POF cable 30 deeper into the connector 40, the leading edge of the sheathing material interconnecting the two optical fiber cores 32 encounters the sharp edge 46, and is consequently split thereby physically separating the two optical fiber cores 32. The user can continue to push the POF cable 30 into the connector 30 until the POF cable 30 aligns and mates with the electro-optical transceivers 48, i.e. wherein each separated optical fiber core 32 enters one of the single passages 51 and is in optical communication with its respective transceiver 48. Each passage 51 is configured to have a diameter substantially the same as the split portion of the POF cable 30, such that when the split portions of the POF cable 30 are within the passages 51, the POF cable 30 can be held securely within the passages 51 via friction. The passages 51 may, for example, have a diameter of 2.3 mm when being using with POF cable 30 that is composed of a pair of POF cores 32 each having a diameter of about 2.2 mm (including the covering sheathing material). In the depicted embodiment, the bore front end 53 serves primarily to align the POF cable 30 for splitting by the sharp edge 46; consequently, the single passage 53 has a height of about 2.5 mm and a width of about 5.0 mm.

A benefit of integrating the sharp edge 46 within the connector 40 is that the user does not have to manually split, or prepare, the cable 30 prior to inserting it into the connector 40. Manually splitting POF cable 30 lengthwise using a blade or X-acto™ knife, for example, can be a cumbersome and dangerous process. For example, the ends of the POF cable 30 can become damaged and require repair. While the damaged ends of the POF cable 30 can simply be snipped away using a pair of scissors, users of traditional POF cable connectors then need to be prepared, or split, the POF cable 30 again. Consequently, the user may have to manually split the same length of POF cable 30 multiple times, thereby compounding the annoyance the user feels and the danger to which the user is exposed. By integrating the sharp edge 46 within the connector 40, the user only needs to insert unprepared cable 30 into the connector 40 and the cable 30 will be split automatically, thereby resulting in a more pleasant user experience and greatly reducing the likelihood of injury.

The guiding grooves/bore 54 is also positioned within the housing 40 such that the POF cable 30 is properly aligned with the electro-optical transceivers 48 such that the cable inner POF cores 32 can transmit optical signals to the electro-optical transceivers 48, and vice-versa.

While friction between the guiding grooves/bore 54 and POF cable 30 helps to secure the POF cable 30 in place, lever assembly 55 can also be used to further frictionally secure the POF cable 30 in position. The lever assembly 55 includes the actuating member 44, fixedly coupled to a cable retaining member 58. In the depicted exemplary embodiment, the cable retaining member 58 has a sloped bottom that slides along the inclined inner surface 56 in the lever assembly cavity of the bottom housing piece 42. The cable retaining member 58 can slide laterally between the secured and unsecured positions. In the unsecured position, the cable retaining member 58 is at the base of the inclined inner surface 56; in the secured position, the cable retaining member 58 is elevated and nearer to the top of the inclined inner surface 56. When in the unsecured position, the cable retaining member 58 is sufficiently distant from POF cable 30 that the POF cable 30 can be inserted into and withdrawn from the connector 40 without being impeded by the cable retaining member 58. Once the POF cable 30 is fully inserted into the connector 40, the cable retaining member 58 can be moved to the secured position (e.g.: by having the user apply force to the actuating member 44, thereby sliding the retaining member 53 up the inclined inner surface 56), which pushes the cable retaining member 58 into the inserted POF cable 30 such that the POF cable 30 is frictionally kept in place. Beneficially, as the guiding grooves/bore 54 also help to frictionally retain the POF cable 30, the amount of force that the cable retaining member 58 needs to exert on the POF cable 30 is reduced relative to an embodiment wherein the guiding grooves 54 do not help to frictionally retain the POF cable 30. Consequently, the user is able to move the cable retaining member 58 from the unsecured position to the secured position by applying relatively little force to the actuating member 44, and as the lever assembly 55 need only be designed to withstand relatively low forces, it can be manufactured such that it is relatively small in size. Both of these benefits are useful for integrating the connector 40 on to a consumer device that requires a high density arrangement of connectors, as large connector sizes and having to use relatively high forces to secure optical cable within connector bodies are drawbacks found in prior art connectors that inhibit their usage in such consumer devices.

Also visible in FIGS. 6 and 7 is a triangular positioning wedge 50 projecting upwards from the bottom housing piece 42 and a post 49 that projects upwards from the cable retaining member 58. When the cable retaining member 58 slides from the unsecured position to the secured position, the post 49 bumps into the positioning wedge 50; the positioning wedge 50 and/or post 49 has sufficient flexibility that force exerted by a user will cause one or both the wedge 50 and post 49 to flex, allowing the post 49 to slide past the wedge 50. The positioning wedge 50 is placed such that once the post 49 slides past the wedge 50, the POF cable 30 will be secured in place by the cable retaining member 58. In addition to providing means for securing the cable retaining member 58 against the cable 50, sliding the post 49 past the wedge 50 results in tactile feedback that the user can detect. Therefore, when moving from the unsecured position to the secured position, the feedback provided by the post 49 sliding past the wedge 50 allows the user to sense when the cable retaining member 58 is in the secured position. Similarly, the user is also able to sense when the cable retaining member 58 transitions from the secured to the unsecured position.

Typically, a user uses the connector 40 by setting the actuating member 44 to the unsecured position, inserting a length of duplex POF cable 30 into the aperture 43, splitting the POF cable 30 into two portions each with a POF core 32, and then sliding the actuating member 44 to the secured position. Beneficially, the actuating member 44 does not substantially protrude from the rectangular housing, and therefore does not substantially increase the depth of the connector 40. That is, while the actuating member 44 protrudes enough to allow a user to conveniently and easily slide the actuating member 44 between the secured and unsecured positions, it does not protrude so much that, when the connector 40 is installed on a consumer device such as a laptop, the depth of the connector 40 is increased such that it is prone to impacting objects in the vicinity of the consumer device. The rectangular housing has dimensions of 8 mm high×16 mm wide×20 mm deep, excluding the actuating member 44; the actuating member 44 has dimensions of 7.5 mm high×4.5 mm wide×2 mm deep. Consequently, factoring in the depth of the actuating member 44, the overall dimensions of the connector 40 are 8 mm wide×16 mm high×22 mm deep. As movement of the actuating member 44 cannot be laterally moved beyond the edges is constrained within the width of the rectangular housing, the overall width and height of the connector 40 with the actuator member 44 are the same as the width and height of the rectangular housing. Such a design is in contrast to a design wherein the actuating member 44 slides laterally up and down on the rectangular housing, which would result in the overall height of the connector 40 being greater than the height of the rectangular housing, or a design wherein the actuating member 44 can be pushed into and out of the rectangular housing, which would result in the overall depth of the connector 40 being greater than the depth of the rectangular housing. By keeping the dimensions of the connector 40 relatively small in this fashion, the connector 40 can more easily be used on a consumer device that requires a relatively high density layout of connectors, such as on a laptop computer or a router.

Typical materials that are used to manufacture the depicted embodiment of the connector 40 are accrylonitrile butadiene styrene (ABS) plastic for the top and bottom housing pieces 41 and 42 and the lever assembly 55; brass or phosphor-bronze sheet metal for the EMI shields 47; and tempered surgical steel or stainless steel for the sharp edge 46. The top and bottom housing pieces 41, 42 in this embodiment are formed by injection plastic molding; however other manufacturing techniques can be used as would be known to one skilled in the art.

While particular embodiments of the present invention has been described in the foregoing, it is to be understood that other embodiments are possible within the scope of the invention and are intended to be included herein. For example, the connector 40 can be adapted to receive optical fiber cables with more than two cores. In one specific example, the connector can be modified to accept a quad core cable (not shown) wherein the cores are arrayed in a single row; in this case, the aperture 43 and bore 54 would be widened to conform to the shape and dimensions of the cable. In another specific example, the connector can be modified to accept the quad core cable (not shown) wherein the cores are arrayed in two rows of two cores; in this case, the aperture 43 and bore 54 would be modified to accept the quad core cable, and the sharp edge would be heightened to split the taller cable.

It will be clear to any person skilled in the art that modifications of and adjustments to this invention, not shown, are possible without departing from the spirit of the invention as demonstrated through the exemplary embodiment. The invention is therefore to be considered limited solely by the scope of the appended claims.

Embodiments of the invention in which an exclusive property or privilege is claimed are defined as follows:

1. An optical cable connector, comprising
   (a) a housing;
   (b) an aperture extending through the housing for receiving an optical cable having at least two optical fiber cores for carrying optical signals, each optical fiber core being optically separated and physically interconnected by sheathing material;
   (c) a sharp edge, positioned within the housing so as to split the sheathing material of the optical cable thereby physically separating at least two of the optical fiber cores when the cable is inserted through the aperture and into the housing; and
   (d) electro-optical transceivers configured to convert the optical signals into electrical signals, each transceiver positioned inside the housing so as to be in optical communication with a physically separated optical fiber core inside the housing.

2. An optical cable connector as claimed in claim 1 further comprising a cable guideway inside the housing having a front end in communication with aperture and a rear end in communication with the transceivers, and wherein the sharp edge is positioned in the guideway facing the aperture.

3. An optical cable connector as claimed in claim 2 wherein the cable guideway is a groove on an inside surface of the housing and wherein the sharp edge is a blade which separates a portion of the groove into a pair of passages each in communication with one of the transceivers.

4. An optical cable connector as claimed in claim 3 wherein the cable guideway comprises a pair of grooves on top and bottom inside surfaces of the housing, the pair of grooves aligned to form a bore inside the housing and wherein at least part of the bore is sized to frictionally engage the optical cable.

5. An optical cable connector as claimed in claim 4 wherein the bore is sized to receive the optical cable such that the sheathing material interconnecting the pair of optical fiber cores is positioned against the sharp edge when the optical cable is inserted inside the housing.

6. An optical cable connector as claimed in claim 5 wherein the aperture extends through a front wall of the housing, the transceivers are located near a rear wall of the housing, and the housing has a plurality of slots through which pins of the transceivers extend out of the housing.

7. An optical cable connector as claimed in claim 6 wherein the housing further comprises a plurality of transceiver cavities on at least one inside surface of the housing between the rear wall and the groove, each transceiver cavity for receiving one of the transceivers.

8. An optical cable connector as claimed in claim 7 further comprising a lever assembly, and wherein the housing further comprises a lever assembly cavity on at least one inside surface of the housing and in communication with the aperture and cable guideway, the lever assembly movable within the lever assembly cavity between a secured position wherein lever assembly frictionally engages a portion of the optical cable inserted through the aperture and into the bore, and an unsecured position wherein the lever assembly does not frictionally engage the optical cable inserted through the aperture and into the bore.

9. An optical cable connector as claimed in any one of claims 1 to 7 further comprising a lever assembly disposed within the housing and having a cable retaining member, the lever assembly movable inside the housing between a secured position wherein the member frictionally engages the optical cable inserted through the aperture, and an unsecured position wherein the member does not contact the optical cable inserted through the aperture.

10. An optical cable connector as claimed in claim 9 wherein an inside surface of the housing comprises a lever assembly cavity in which the lever assembly is slidable between the secured and unsecured positions.

11. An optical cable connector as claimed in claim 10 wherein the lever assembly cavity has a surface inclined such that the cable retaining member is elevated when in the secured position relative to when the cable retaining member is in the unsecured position.

12. An optical cable connector as claimed in claim 11 wherein the lever assembly further comprises an actuation member protruding out of the housing and movable by a user to move the lever assembly between the secured and unsecured positions.

13. An optical cable connector as claimed in claim 12 wherein the housing comprises a front wall comprising the aperture and an opening through which the actuation member extends, the opening dimensioned to constrain the actuation member to move within the width of the housing.

14. An optical cable connector as claimed in claim 10 wherein the lever assembly further comprises an actuation member protruding out of the housing and movable by a user to move the lever assembly between the secured and unsecured positions.

15. An optical cable connector as claimed in claim 14 wherein the housing comprises a front wall comprising the aperture and an opening through which the actuation member extends, the opening dimensioned to constrain the actuation member to move within the width of the housing.

16. An optical cable connector as claimed in claim 9 wherein the lever assembly further comprises an actuation member protruding out of the housing and movable by a user to move the lever assembly between the secured and unsecured positions.

17. An optical cable connector as claimed in claim 16 wherein the housing comprises a front wall comprising the aperture and an opening through which the actuation member extends, the opening dimensioned to constrain the actuation member to move within the width of the housing.

18. An optical cable connector as claimed in claim 9 further comprising a positioning wedge protruding from the inner surface of the housing, and wherein the cable retaining member further comprises a post protruding therefrom, the post and wedge positioned to contact each other and at least one of the post and wedge having sufficient flexibility that the post is movable past the wedge when the cable retaining member moves between the secured and unsecured positions.

* * * * *